United States Patent [19]
Uozumi

[11] 3,924,506
[45] Dec. 9, 1975

[54] PIN LOCKING DEVICE
[75] Inventor: Iwao Uozumi, Tokyo, Japan
[73] Assignee: Iwatani & Co., Ltd., Osaka, Japan
[22] Filed: July 2, 1974
[21] Appl. No.: 485,234

[52] U.S. Cl. .............................................. 85/8.1
[51] Int. Cl.² ........................................ F16B 19/00
[58] Field of Search ........... 85/8.9, 8.6, 8.1, 7, 5 N, 85/5 P

[56] References Cited
UNITED STATES PATENTS
| | | | |
|---|---|---|---|
| 750,501 | 1/1904 | Tarbox | 85/8.1 |
| 2,373,722 | 4/1945 | VonOpel | 85/5 P |
| 3,292,480 | 12/1966 | Uozumi | 85/8.1 |

FOREIGN PATENTS OR APPLICATIONS
| | | | |
|---|---|---|---|
| 107,151 | 6/1917 | United Kingdom | 85/7 |
| 407,041 | 2/1934 | United Kingdom | 85/8.1 |

Primary Examiner—Marion Parsons, Jr.
Attorney, Agent, or Firm—Bacon & Thomas

[57] ABSTRACT

The pin locking device comprises a lock washer fitted on a pin fastener, in which a locking pin is inserted, the lock washer having relatively narrow and broad tabs alternately extended in its rim portion, wherein a pair of narrow tabs retain the locking pin therebetween, and wherein a pair of adjacent broad tabs are inwardly bent over one end of the locking pin to secure same against a possible torque as well as shear.

3 Claims, 7 Drawing Figures

PIN LOCKING DEVICE

This invention relates to a pin locking device to be used in combination with a locking pin passing through a hole in one end of a pin fastener, and more particularly, relates to a pin locking device fitted on a pin fastener by which a locking pin is locked in the hole formed in one end of the pin fastener, thereby preventing the pin fastener from dropping out of the assembly.

More specifically, the invention is concerned with improvements upon a pin locking device of similar nature formerly developed by the inventor, which comprises a lock washer for retaining a locking pin in the hole made in one end of a pin fastener, the lock washer having tabs externally extended in the rim portion thereof. The tabs are intended to sustain the locking pin between opposite pair thereof, thereby enabling the locking pin to stay in the hole of the pin fastener. Thus, the pin fastener is secured against a possible dropping out of the assembly of members. Advantageously, the locking pin and the lock washer can be readily released. In addition, they are repeatedly usable. However, there was a demand in the field that the locking pin be equally secure against a possible twisting strain or torque.

In order to meet this demand in the related field, the present invention has provided an improved pin locking device of sufficient strength against a relatively large torque as well as shear.

According to the present invention, a pin locking device comprises a lock washer provided with first tabs of relatively narrow width and second tabs of relatively broad width in the rim portion thereof, the first and second tabs being alternately extended in the same direction.

In a preferred embodiment of the pin locking device according to the invention the second tabs have a width beyond the outside diameter of the locking pin, whereas the first tabs have a width substantially equal thereto, thereby strengthening the retaining of the locking pin in the lock washer when the second tabs adjacent to the locking pin are bent to hold the same therebetween.

Preferably, the pin locking device according to the invention is provided with grooves in the inside bottom surface of the lock washer, the grooves being extended between each pair of opposite first tabs, thereby eliminating frictional troubles between the locking pin and the inside bottom surface of the lock washer.

The invention will be more particularly described by way of example with reference to the accompanying drawings, in which.

Figure 1:
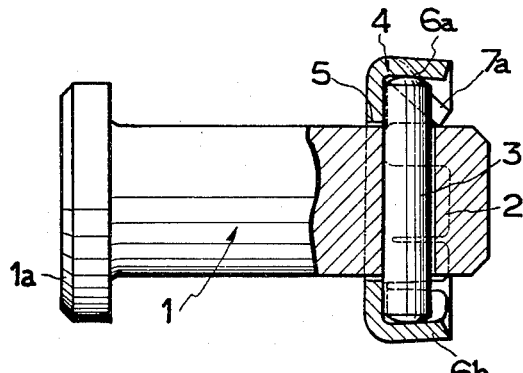
FIG. 1 is a vertical section through a pin locking device according to the invention.
Figure 2:
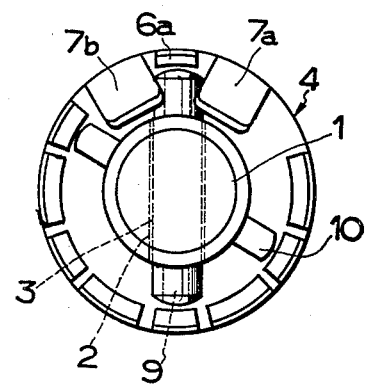
FIG. 2 is a plan view of the pin locking device shown in FIG. 1.

Referring to FIG. 1, a pin fastener 1 is provided with a head 1a on one end and the other end is provided with a hole 2 to accept a locking pin 3 so as to prevent the pin fastener 1 from dropping out of assembled members (not shown). The pin fastener 1 has a lock washer 4 mantled thereon. A pin locking device of this invention consists substantially of the locking pin 3 and the lock washer 4. The locking pin 3 is, for example, made of steel wire of parallel rod shape, preferably, in a cylindrical form. Unlike conventional cotter pins, the locking pin 3 has no eye or legs to be spread.

Figure 7:
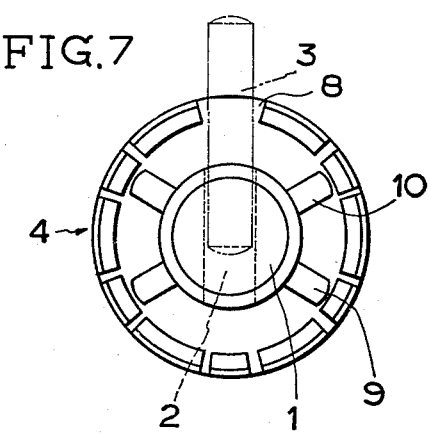
FIG. 7 is a schematic view explaining the operation of the pin locking device shown in FIG. 1.

The lock washer 4 takes the form of a ring, and is provided with an opening 5 in the center, through which the pin fastener 1 is passed. In addition, the lock washer 4 is provided with tabs 6a to 6e in the rim portion, wherein the individual tabs have a width substantially equal to the outside diameter of the locking pin 3. Also, the tabs 6a to 6e are equally spaced, and extended at right angles to the flat part of the washer or slightly inwardly in the same direction. At each space between adjacent tabs 6a to 6e, there are provided further tabs 7a to 7f, which have a width broader than that of the tabs 6a to 6e. Likewise, the tabs 7a to 7f are extended at right angles to or slightly inwardly of the washer in the same direction as the tabs 6a to 6e. Thus, the lock washer 4 has relatively narrow tabs and relatively broad tabs alternately arranged in the rim portion thereof. In the embodiment illustrated, the portion 8 has no tab but is vacant, so as to allow the locking pin 3 to pass through, as best illustrated in FIG. 7.

Figure 3:
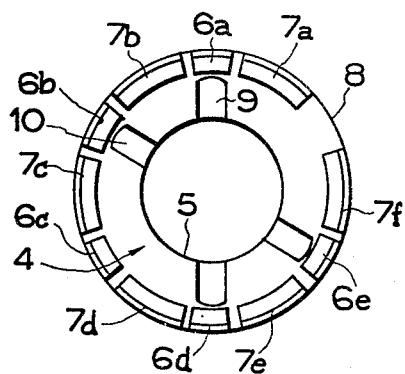
FIG. 3 is a plan view of a lock washer for use in the pin locking device shown in FIG. 1.

In the space between the rim of the opening 5 and each of the tabs 6a to 6e, there are provided grooves 9 and 10 as best illustrated in FIG. 3. The grooves 9 and 10 are semi-circular in cross-section so as to accept the cylindrical locking pin 3 therein, thereby avoiding a possible frictional trouble between the locking pin and the lock washer.

Figure 4:
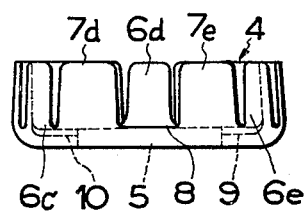
FIG. 4 is a side view of the lock washer shown in FIG. 3.
Figure 5:
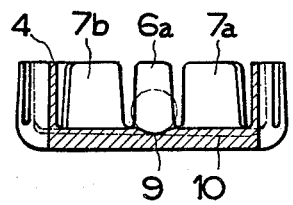
FIG. 5 is a vertical section through the lock washer shown in FIG. 4.
Figure 6:
FIG. 6 is a front view of a locking pin for use in the pin locking device according to the invention.

The pin locking device according to the invention is operated as follows:

The lock washer 4 is fitted onto the pin fastener 1, and the locking pin 3 is inserted into the hole 2 through the portion 8 in the lock washer 4. Then, the lock washer 4 is rotated until the opposite ends of the locking pin 3 come into engagement with the tabs 6a and 6d, with the locking pin fitting in the groove 9. Subsequently, the adjacent tabs 7a and 7b are inwardly bent in such a manner that they hold the opposite end portions of the locking pin 3 therebetween, thereby preventing the locking pin 3 from displacing laterally or angularly. This will be of particular advantage when any twisting strain or torque occurs on the pin fastener 1. Since the tabs 7a to 7f are made relatively wide with respect to the tabs 6a to 6e, the locking pin 3 is sufficiently held by the adjacent tabs 7a and 7b against a possible torque upon the pin fastener. As seen from FIGS. 4 and 5, the root portions of the tabs 6a to 6e and 7a to 7f are deliberately made thick sufficiently to withstand strains involved in bending any of the tabs 7a to 7f.

On the other hand, the locking pin 3 lies in the groove 9 or 10, thereby strengthening the holding of the locking pin 3 by the tabs 6a and 6d, or 6b and 6e. Also, the grooves 9 and 10 serve to locate the locking pin 3 exactly at the locking place between the tabs 6a and 6d, or 6b and 6e. Moreover, the grooves 9 and 10 can reduce friction between the locking pin 3 and the inside bottom surface of the lock washer 4, which would otherwise tend to cause unpleasant vibration and noise.

After the locking pin 3 has been inserted into the hole 2 through the portion 8, it is preferred that either tab 7a or 7f is inwardly bent, thereby enabling the same to serve as a stop limiting rotation of the lock washer 4. When the locking pin 3 is to be removed, one of the bent tabs 7a or 7b is straigntened up to its original condition, thereby allowing the lock washer 4 to rotate. The tabs 7a to 7f are alternatively used, depending upon any pair of the tabs 6a to 6e selected, thereby ensuring the repeated usage of the lock washer 4.

As is evident from the foregoing, a pin locking device according to the present invention imparts to a pin fastener sufficient strength against possible torque and shear thereupon. In addition, the pin fastener is usable for either permanent or quick-release usage.

What is claimed is:

1. In a pin fastener assembly:
a fastener pin having a transverse bore therethrough;
a lock washer embracing said pin adjacent said bore and having a diametrically extending groove thereacross aligned with said bore;
a locking pin extending through said bore and having portions complementary to said groove and lying therein to engage the same throughout a substantial area of contact;
diametrically opposed tabs on the periphery of said washer, of a width no greater than the corresponding dimension of said locking pin at the ends of said groove and extending across the ends of said locking pin to hold the same in said bore; and
further tabs, on each side of said opposed tabs, substantially wider than said opposed tabs and being bent inwardly to engage the sides of said locking pin to retain the same in said groove.

2. A pin locking device as claimed in claim 1, wherein the first and second tabs extend substantially at right angles from the rim portion of said lock washer.

3. A pin locking device as claimed in claim 1, wherein the lock washer is in the form of a ring, and the first and second tabs have concave inside surfaces.

* * * * *